(12) United States Patent
Muraoka

(10) Patent No.: US 11,980,118 B2
(45) Date of Patent: May 14, 2024

(54) SEEDSHEET MANUFACTURING APPARATUS AND SEEDSHEET

(71) Applicant: Shuhou Co., Ltd., Fukui (JP)

(72) Inventor: Kouji Muraoka, Fukui (JP)

(73) Assignee: SHUHOU CO., LTD., Fukui (JP)

( * ) Notice: Subject to any disclaimer, the term of this patent is extended or adjusted under 35 U.S.C. 154(b) by 283 days.

(21) Appl. No.: 17/605,267

(22) PCT Filed: Dec. 7, 2020

(86) PCT No.: PCT/JP2020/045441
§ 371 (c)(1),
(2) Date: Oct. 21, 2021

(87) PCT Pub. No.: WO2022/123621
PCT Pub. Date: Jun. 16, 2022

(65) Prior Publication Data
US 2022/0346305 A1 Nov. 3, 2022

(51) Int. Cl.
*A01C 1/04* (2006.01)
*B30B 3/00* (2006.01)
*B30B 11/16* (2006.01)

(52) U.S. Cl.
CPC .............. *A01C 1/044* (2013.01); *B30B 3/005* (2013.01); *B30B 11/16* (2013.01); *A01C 2001/048* (2013.01)

(58) Field of Classification Search
CPC .. B30B 3/00; B30B 3/005; B30B 3/04; B30B 3/045; B30B 9/20; B30B 9/202;
(Continued)

(56) References Cited

U.S. PATENT DOCUMENTS

| 5,073,401 A | 12/1991 | Mohr |
| 2020/0367423 A1 | 11/2020 | Miyahara et al. |

FOREIGN PATENT DOCUMENTS

| JP | S4991816 A | 9/1974 |
| JP | H03297306 A | 12/1991 |

(Continued)

OTHER PUBLICATIONS

International Search Report (PCT/ISA/210) and Written Opinion (PCT/ISA/237) dated Feb. 22, 2021, by the Japan Patent Office as the International Searching Authority for International Application No. PCT/JP2020/045441.

*Primary Examiner* — Jimmy T Nguyen
(74) *Attorney, Agent, or Firm* — BUCHANAN INGERSOLL & ROONEY PC

(57) ABSTRACT

To provide a seedsheet manufacturing apparatus that can increase a manufacturing speed and a seedsheet. A seedsheet manufacturing apparatus includes: a paste reservoir configured to store a paste in which a seed and a fluid are mixed; a plate cylinder disposed above the paste reservoir; a doctor blade configured to scrape a portion of the paste adhering to a surface of the plate cylinder; a pressing roller disposed such that the pressing roller faces the plate cylinder and a mounting paper is allowed to pass through a gap formed between the pressing roller and the surface of the plate cylinder; a supply unit configured to feed the mounting paper to the gap; and a recovery unit configured to recover the mounting paper that passes through the gap.

3 Claims, 11 Drawing Sheets

(58) Field of Classification Search
CPC ........... B30B 9/241; B30B 9/28; B30B 11/00; B30B 11/003; B30B 11/006; B30B 11/28; B30B 11/12; B30B 11/14; B30B 11/16; A01C 1/044
See application file for complete search history.

(56) References Cited

FOREIGN PATENT DOCUMENTS

| | | | | | |
|---|---|---|---|---|---|
| JP | H1120129 | A | * | 1/1999 | ............. B41F 16/00 |
| JP | 6647585 | B2 | | 2/2020 | |
| KR | 20180038207 | A | * | 4/2018 | ............. A01C 1/044 |

* cited by examiner

SEEDSHEET MANUFACTURING APPARATUS AND SEEDSHEET

TECHNICAL FIELD

The present disclosure relates to a seedsheet manufacturing apparatus that manufactures a seedsheet by a printing method and to a seedsheet.

BACKGROUND ART

Conventionally, there is a known seedsheet where an adhesive agent of required size is applied to a base material, the base material being a sheet-like paper or other material, and plant seeds are fixed to the base material by the adhesive agent. The seedsheet is manufactured by a seedsheet manufacturing apparatus. The seedsheet manufacturing apparatus includes a mounting paper supply unit, an adhesive agent applying unit, a seed placement unit, a removal unit, and a seed fixing unit. The mounting paper supply unit is configured to supply a long mounting paper. The adhesive agent applying unit is configured to apply an adhesive agent to one surface of the mounting paper. The seed placement unit is configured to place seeds on the one surface. The removal unit is configured to remove seeds that do not adhere to the mounting paper. The seed fixing unit fixes the seeds onto the mounting paper in such a manner that a pair of rollers sandwiches the mounting paper to form recessed portions on the mounting paper by the pressure of the rollers, and the seeds are embedded into these recessed portions (see Patent Literature 1, for example).

CITATION LIST

Patent Literature

Patent Literature 1: Japanese Patent No. 6647585

SUMMARY OF INVENTION

Technical Problem

The seedsheet disclosed in Patent Literature 1 is manufactured through a step of arranging an adhesive agent and seeds on a thin mounting paper that can be decomposed by water and a step of applying pressure to the mounting paper with rolls to cause the seeds to be pressure-bonded to the mounting paper. Therefore, when the manufacturing speed is increased, tension is applied to the mounting paper, thus breaking the mounting paper and hence, there is a problem that a large number of steps are required and the process is complicated.

The present disclosure has been made to solve the above-mentioned problem, and it is an object of the present disclosure to provide a seedsheet manufacturing apparatus that can increase a manufacturing speed and to provide a seedsheet.

Solution to Problem

A seedsheet manufacturing apparatus according to one embodiment of the present disclosure includes: a paste reservoir configured to store a paste in which a seed and a fluid are mixed; a plate cylinder disposed above the paste reservoir; a doctor blade configured to scrape a portion of the paste adhering to a surface of the plate cylinder; a pressing roller disposed such that the pressing roller faces the plate cylinder and a mounting paper is allowed to pass through a gap formed between the pressing roller and the surface of the plate cylinder; a supply unit configured to feed the mounting paper to the gap; and a recovery unit configured to recover the mounting paper that passes through the gap.

A seedsheet according to another embodiment of the present disclosure includes: a mounting paper; and a printing element formed by curing a paste arranged on a surface of the mounting paper in a predetermined pattern, wherein the paste is formed by mixing a seed and a fluid containing at least a glue.

Advantageous Effects of Invention

An embodiment of the present disclosure adopts the structure where a paste in which seeds, an adhesive agent, and other elements are mixed is printed on the mounting paper as the printing element. Accordingly, it is possible to reduce portions where a force is applied to the mounting paper in the seedsheet manufacturing apparatus and hence, breakage of the mounting paper can be prevented. Further, in the present disclosure, seeds are fixed to the mounting paper by printing and hence, it is possible to increase a manufacturing speed of the seedsheet.

BRIEF DESCRIPTION OF DRAWINGS

FIG. 3 is a plan view of the seedsheet 10 shown in FIG. 2, as viewed from the side of a mounting paper surface 11a.

FIG. 6 is a plan view of the seedsheet 210 shown in FIG. 5, as viewed from the side of a mounting paper surface 11a.

FIG. 8 is a plan view of a seedsheet 310, manufactured by the seedsheet manufacturing apparatus 300 according to Embodiment 3, as viewed from the side of a mounting paper surface 11a.

DESCRIPTION OF EMBODIMENTS

Embodiment 1

Figure 1:
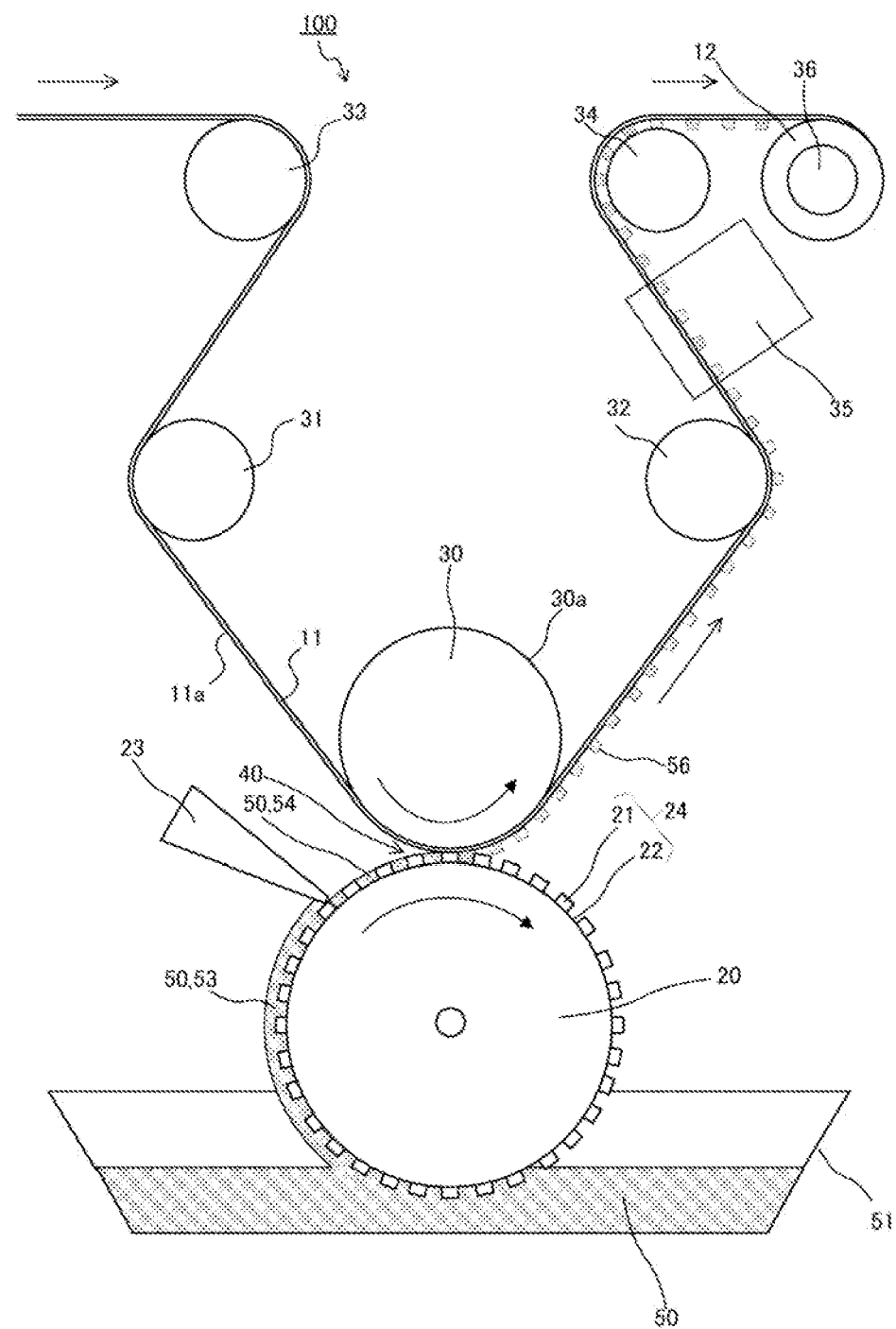
FIG. 1 is a schematic view of a main part of a seedsheet manufacturing apparatus 100 according to Embodiment 1.

Hereinafter, seedsheets and seedsheet manufacturing apparatuses according to the present disclosure will be described with reference to drawings. The present disclosure is not limited by Embodiments described hereinafter. In the respective drawings, identical components are given the same reference symbols, and the repeated description will be partially omitted. Further, the respective drawings are schematic views, and the present disclosure is not limited to shapes shown in the drawings.

<Seedsheet Manufacturing Apparatus 100>

Figure 2:
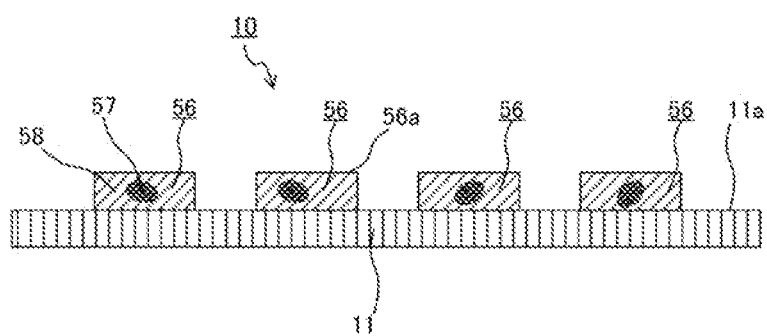
FIG. 2 is a schematic view of the cross sectional structure of a seedsheet 10 according to Embodiment 1.
Figure 3:
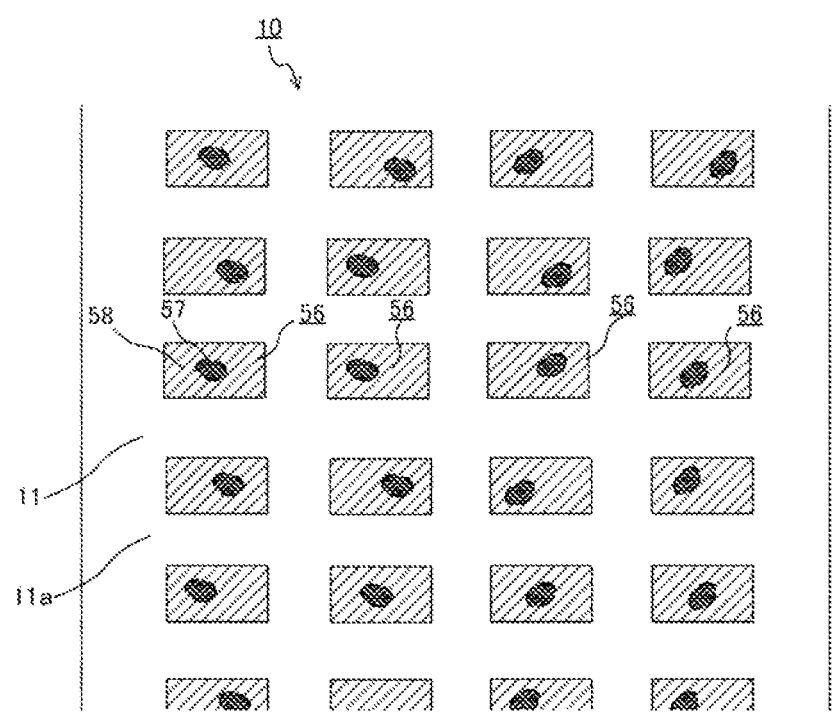

FIG. 1 is a schematic view of a main part of a seedsheet manufacturing apparatus 100 according to Embodiment 1. FIG. 2 is a schematic view of the cross sectional structure of a seedsheet 10 according to Embodiment 1. FIG. 3 is a plan view of the seedsheet 10 shown in FIG. 2, as viewed from the side of a mounting paper surface 11a. The seedsheet manufacturing apparatus 100 is an apparatus configured to print a paste 50, into which plant seeds 57 are mixed, on the surface of a mounting paper 11. That is to say, the seedsheet manufacturing apparatus 100 is an apparatus for forming printing elements 56, formed by the paste 50, on the surface of the mounting paper 11, being an object to be printed, to obtain the seedsheet 10 being a printed item. The paste 50 corresponds to ink in normal printing, and each printing element 56 corresponds to one dot forming a character or an image formed by ink in the normal printing. The seedsheet manufacturing apparatus 100 has a configuration substantially equal to the configuration of a gravure printing machine, for example. That is to say, the seedsheet manufacturing apparatus 100 includes a plate cylinder 20 and a pressing roller 30. Cells 22 being recesses are formed on the surface of the plate cylinder 20. The seedsheet manufacturing apparatus 100 pushes the mounting paper 11 against the surface of the plate cylinder 20 to transfer the paste 50 filled into the cells 22 to the mounting paper surface 11a.

The seedsheet manufacturing apparatus 100 includes the pressing roller 30 configured to push the mounting paper 11 against the surface of the plate cylinder 20. The pressing roller 30 is disposed such that the surface of the pressing roller 30 faces the surface of the plate cylinder 20, and the mounting paper 11 is sandwiched between a surface 30a of the pressing roller 30 and a surface 24 of the plate cylinder 20. The mounting paper 11 is continuously fed into a gap 40 formed between the pressing roller 30 and the plate cylinder 20.

The seedsheet manufacturing apparatus 100 includes feed rollers 31, 32, 33, 34. The feed rollers 31, 32, 33, 34 support the mounting paper 11, which is a long sheet. The number of and the arrangement of the feed rollers 31, 32, 33, 34 may be suitably changed.

The seedsheet manufacturing apparatus 100 includes a supply unit (not shown in the drawing) configured to supply the mounting paper 11 and a recovery unit 36 configured to wound and recover the seedsheet 10. The mounting paper 11 of the seedsheet 10 is obtained in such a manner that a paper, a woven fabric, or a film, for example, is formed into a roll shape. A non-woven paper, a non-woven fabric, or a water-soluble film may be used for the mounting paper 11. The mounting paper 11 in a roll shape is installed in the supply unit, and the mounting paper 11 is fed from the roll. The mounting paper 11 on which printing is performed is wound by the recovery unit 36, and is recovered as the seedsheet 10 in a roll shape. The shape of the mounting paper 11 and the seedsheet 10 in the supply unit and the recovery unit 36 is not limited to a roll shape. For example, the seedsheet 10 may be cut into a predetermined length by the recovery unit 36, and may be recovered as a plurality of seedsheets 10.

The seedsheet manufacturing apparatus 100 includes a paste reservoir 51. The paste reservoir 51 is configured such that the paste 50 is filled into the paste reservoir 51 and the lower portion of the plate cylinder 20 is immersed in the paste 50. The plate cylinder 20 causes the paste 50 to adhere to the surface 24 in the paste reservoir 51. A paste 53 adhering to the surface 24 is moved toward the pressing roller 30 in a state of being placed on protruding portions 21 and the cells 22 formed on the surface 24 of the plate cylinder 20. The plate cylinder 20 is not necessarily directly immersed in the paste 50. For example, the paste 50 may be indirectly caused to adhere to the surface 24 of the plate cylinder 20 via a roller (not shown in the drawing) immersed in the paste 50 in the paste reservoir 51.

A doctor blade 23 is brought into contact with the upper portion of the plate cylinder 20. The doctor blade 23 is disposed to scrape excess paste 50 on the surface 24 at a position in front of where the surface 24 of the plate cylinder 20 approaches the pressing roller 30 during the rotation of the plate cylinder 20. The doctor blade 23 scrapes the paste 50 on the surfaces of the protruding portions 21, and leaves a paste 54 in the cells 22. With such an operation, when the surface 24 of the plate cylinder 20 reaches the gap 40, the paste 50 is arranged only in the cells 22 formed on the surface 24 of the plate cylinder 20.

The arrangement and the shape of the cells 22 on the surface 24 of the plate cylinder 20 may be suitably changed. For example, the interval between the cells 22 may be suitably changed corresponding to the interval at which the seeds 57 are arranged. When the cells 22 are arranged to form a predetermined design, the seeds 57 can be arranged to form the predetermined design. Further, when the seedsheet 10 is laid on the surface of soil as it is, for example, the predetermined design can be easily formed by flowers of plants that grow from the seeds 57.

In the gap 40 formed between the plate cylinder 20 and the pressing roller 30, the mounting paper 11 is pushed against the surface 24 of the plate cylinder 20. The paste 54 in the cells 22 adheres to the mounting paper surface 11a. That is to say, the paste 54 is transferred to the mounting paper 11 from the plate cylinder 20.

A fixing machine 35 is disposed between the plate cylinder 20/the pressing roller 30 and the recovery unit 36. The fixing machine 35 is provided to solidify the printing elements 56 and fix the printing elements 56 to the mounting paper surface 11a. The fixing machine 35 may be a drier, for example, and solidifies the surfaces of the printing elements 56 with hot air. Alternatively, the fixing machine 35 may solidify the printing elements 56 by pushing a roller having a high surface temperature against the printing elements 56.

The seedsheet manufacturing apparatus 100 may not include the fixing machine 35, and the printing elements 56 may be solidified by natural air drying.

As described above, the seedsheet manufacturing apparatus 100 according to Embodiment 1 includes the paste reservoir 51, the plate cylinder 20, the doctor blade 23, and the pressing roller 30. The paste reservoir 51 is configured to store the paste 50 in which the seeds 57 and a fluid 58 are mixed. The plate cylinder 20 is disposed above the paste reservoir 51. The doctor blade 23 is configured to scrape the paste 50 adhering to the surface of the plate cylinder 20, that is, the paste 53 protruding from the recessed portions. The pressing roller 30 is configured to cause the mounting paper 11 to pass through between the pressing roller 30 and the surface 24 of the plate cylinder 20 in a state where the mounting paper 11 is sandwiched between the pressing roller 30 and the surface 24 of the plate cylinder 20. The seedsheet manufacturing apparatus 100 also includes the supply unit configured to supply the mounting paper 11 into the gap 40 and the recovery unit 36 configured to recover the mounting paper 11 that passes through the gap 40. With such a configuration, the seedsheet manufacturing apparatus 100 can manufacture the seedsheet 10 by transferring the fluid 58 containing the seeds 57 to the mounting paper 11 in the gap 40. The seedsheet manufacturing apparatus 100 is configured such that the mounting paper 11 is only sandwiched between the plate cylinder 20 and the pressing roller 30 in a direction along the surface in the gap 40 formed between the plate cylinder 20 and the pressing roller 30, so that a step of applying a force to the mounting paper 11 is minimized. Therefore, in the seedsheet manufacturing apparatus 100, there is a low chance of breakage of the mounting paper 11, and it is possible to increase a feed speed of the mounting paper 11.

The cells 22, being the recesses, are formed on the surface 24 of the plate cylinder 20. With such a configuration, the printing elements 56 containing the seeds 57 are arranged in the cells 22, and are transferred to the mounting paper surface 11a. Therefore, the seeds 57 are arranged on the seedsheet 10 at predetermined intervals. By suitably changing the interval between the cells 22, the seedsheet 10 allows the seeds 57 to be easily arranged corresponding to various circumstances.

The seedsheet manufacturing apparatus 100 further includes the fixing machine 35 configured to cure the printing elements 56. With such a configuration, the printing elements 56 are fixed to the mounting paper surface 11a with more certainty. Further, the fixing machine 35 rapidly cures the printing elements 56, so that it is possible to increase a manufacturing speed of the seedsheet 10.

<Seedsheet 10>

As described above, the seedsheet manufacturing apparatus 100 can arrange the seeds 57 on the mounting paper surface 11a in a predetermined pattern by printing the paste 50 containing the seeds 57 on the mounting paper 11. FIG. 2 and FIG. 3 show the structure of a portion of the seedsheet 10. The printing elements 56 arranged in the predetermined pattern are placed on the mounting paper surface 11a. The plurality of printing elements 56 arranged on the mounting paper surface 11a include the fluid 58 and the seeds 57. The fluid 58 is water, glue, starch, or other elements contained in the paste 50. In a state where the seedsheet 10 shown in FIG. 2 and FIG. 3 is completed, the fluid 58 is solidified, thus prevented from flowing.

Each of the printing elements 56 contains at least one seed 57. Each of the printing elements 56 may contain a plurality of seeds 57. In an actual seedsheet, some of the plurality of printing elements 56 arranged on the mounting paper surface 11a may not contain the seed 57.

The paste 50 is formed by mixing water glue and the seeds 57, for example. The paste 50 may further contain water, starch, fertilizer, chemicals, or other elements. The paste 50 has a viscosity of a level that allows the paste 50 to adhere to the surface 24 of the plate cylinder 20 and to the mounting paper surface 11a. The seeds 57 are mixed into the paste 50 by adjusting the seeds 57 to a density at which the seeds 57 distributes in the paste 50 at a predetermined density, and are arranged in the cells 22. The size of the cells 22 is suitably adjusted according to the size of the seeds 57.

Usually, the seeds 57 of a plant, such as flowers, grass, or moss are planted in soil to grow. In the case of rice, seeds are generally grown into seedlings, and the seedlings are planted in a paddy field. However, in recent years, there may be a case where rice seeds are directly planted in a paddy field. In the seedsheet 10 described above, the printing elements 56 are arranged in a predetermined pattern. Therefore, by merely fixing the seedsheet 10 to the soil, the seeds 57 can be arranged at predetermined intervals. A significant portion of the printing elements 56 printed on the mounting paper surface 11a of the seedsheet 10 is glue, for example. By watering the soil after the seedsheet 10 is disposed on the soil, the seedsheet 10 absorbs moisture, thus allowing the seeds 57 to sprout.

The seedsheet 10 has a sheet-like shape and hence, the seeds 57 can be handled more easily compared with the case where the seeds 57 are handled in the form of grains. Further, when the printing elements 56 of the seedsheet 10 contain a fertilizer, the fertilizer can provide nutrients after the seeds 57 are sprouted.

Embodiment 2

A seedsheet manufacturing apparatus 200 and a seedsheet 210 according to Embodiment 2 will be described. The seedsheet manufacturing apparatus 200 is obtained by changing the shape of the plate cylinder 20 of the seedsheet manufacturing apparatus 100 according to Embodiment 1. Constitutional elements having the same function and manner of operation as the constitutional elements in Embodiment 1 are given the same reference symbols, and the repeated description of such constitutional elements will be omitted.

Figure 4:
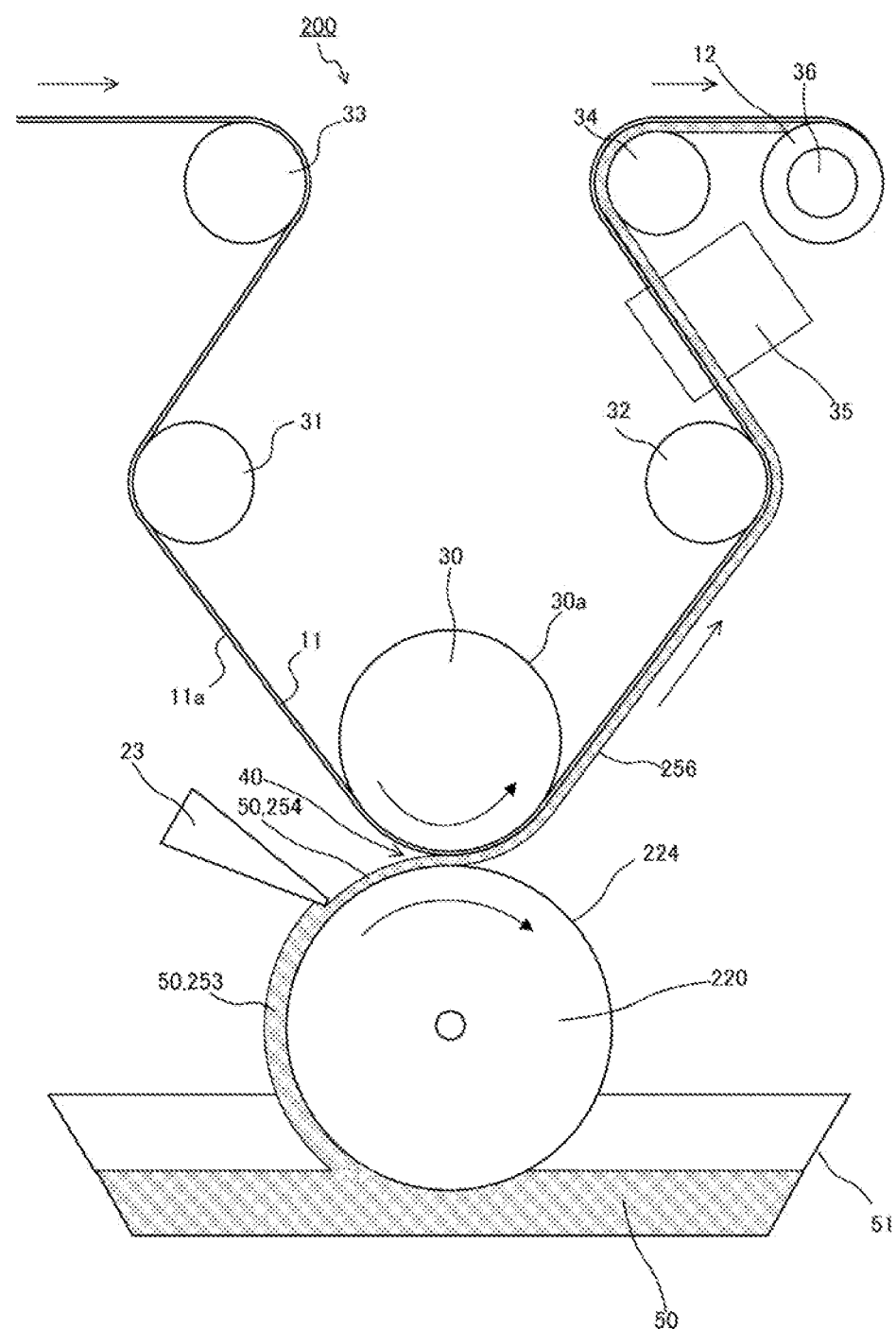
FIG. 4 is a schematic view of a main part of a seedsheet manufacturing apparatus 200 according to Embodiment 2.
Figure 5:
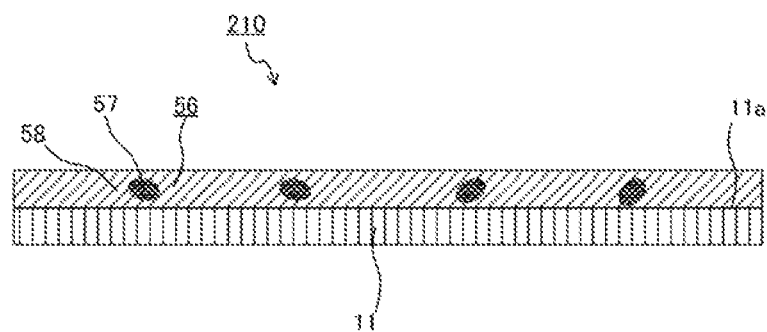
FIG. 5 is a schematic view of the cross sectional structure of a seedsheet 210 according to Embodiment 2.
Figure 6:
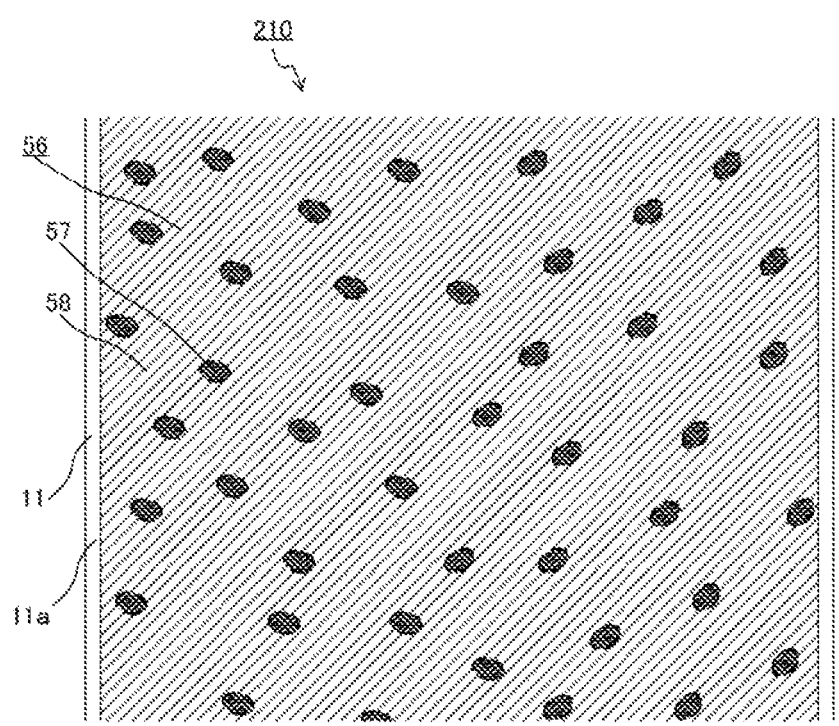

FIG. 4 is a schematic view of a main part of the seedsheet manufacturing apparatus 200 according to Embodiment 2. FIG. 5 is a schematic view of the cross sectional structure of the seedsheet 210 according to Embodiment 2. FIG. 6 is a plan view of the seedsheet 210 shown in FIG. 5, as viewed from the side of a mounting paper surface 11a. In the seedsheet manufacturing apparatus 200 according to Embodiment 2, a plate cylinder 220 has no cells 22, and a surface 224 forms one continuous cylindrical surface. Also in the modification, the lower portion of the plate cylinder 220 is immersed in the paste 50 in the paste reservoir 51, so that the paste 50 having a predetermined thickness adheres to the plate cylinder 220. The doctor blade 23 adjusts a paste 253 adhering to the surface 224 of the plate cylinder 220 to a paste 254 having a predetermined thickness. A gap formed between the mounting paper 11 and the surface 224 of the plate cylinder 220 is set to be smaller than the thickness of the paste 254. The paste 254 adheres to the mounting paper surface 11a. A layer of a printing element 256 containing the seeds 57 is uniformly formed on the mounting paper surface 11a.

In the seedsheet manufacturing apparatus 200 according to Embodiment 2, the layer of the printing element 256 is uniformly forms on the mounting paper surface 11a of the seedsheet 210. The seeds 57 are mixed into the paste 50 to be uniformly dispersed within the paste 50, so that the printing element 256 that is fixed to the mounting paper surface 11a entirely contains the seeds 57 at a uniform density as shown in FIG. 3, for example. The interval between the seeds 57 contained in the printing element 256 is adjusted according to the ratio of the number of seeds 57 to the amount of the fluid 58 of the paste 50. That is to say, when the number of seeds 57 per unit amount of the fluid 58 is small, the seeds 57 have a large average value of the intervals. To the contrary, when the number of seeds 57 per unit amount of the fluid 58 is large, the seeds 57 have a small average value of the intervals. However, the seeds 57 are irregularly arranged on the seedsheet 210.

In the seedsheet 210, the printing element 256 is fixed to the mounting paper surface 11a as one layer and hence, even if the mounting paper 11 as a single body has low strength, the seedsheet 210 has relatively high strength. Further, there is an advantage that the printing element 256 can contain a large amount of component, such as glue and a fertilizer, in addition to the seeds 57.

Embodiment 3

A seedsheet manufacturing apparatus 300 and a seedsheet 310 according to Embodiment 3 will be described. The seedsheet manufacturing apparatus 300 is obtained by changing the shape of the plate cylinder 20 of the seedsheet manufacturing apparatus 100 according to Embodiment 1. Constitutional elements having the same function and manner of operation as the constitutional elements in Embodiment 1 are given the same reference symbols, and the repeated description of such constitutional elements will be omitted.

Figure 7:
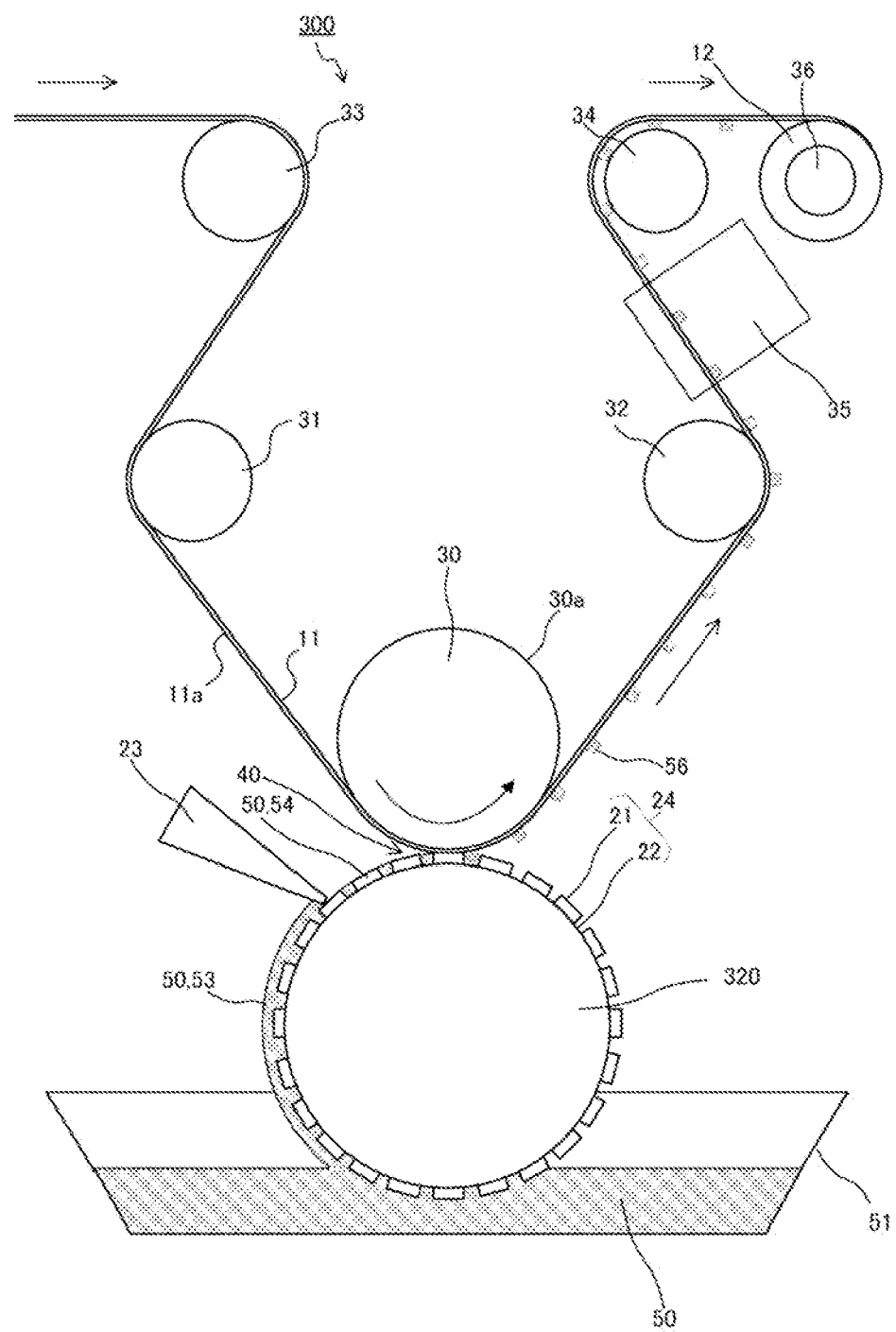
FIG. 7 is a schematic view of a main part of a seedsheet manufacturing apparatus 300 according to Embodiment 3.

FIG. 7 is a schematic view of a main part of the seedsheet manufacturing apparatus 300 according to Embodiment 3. The seedsheet manufacturing apparatus 300 according to Embodiment 3 is obtained by changing the arrangement of the cells 22 of the plate cylinder 20 of the seedsheet manufacturing apparatus 100 according to Embodiment 1. In a plate cylinder 320 of the seedsheet manufacturing apparatus 300, the pitch of the cells 22 is set to be larger than the pitch of the cells 22 of the plate cylinder 20 according to Embodiment 1.

Figure 8:
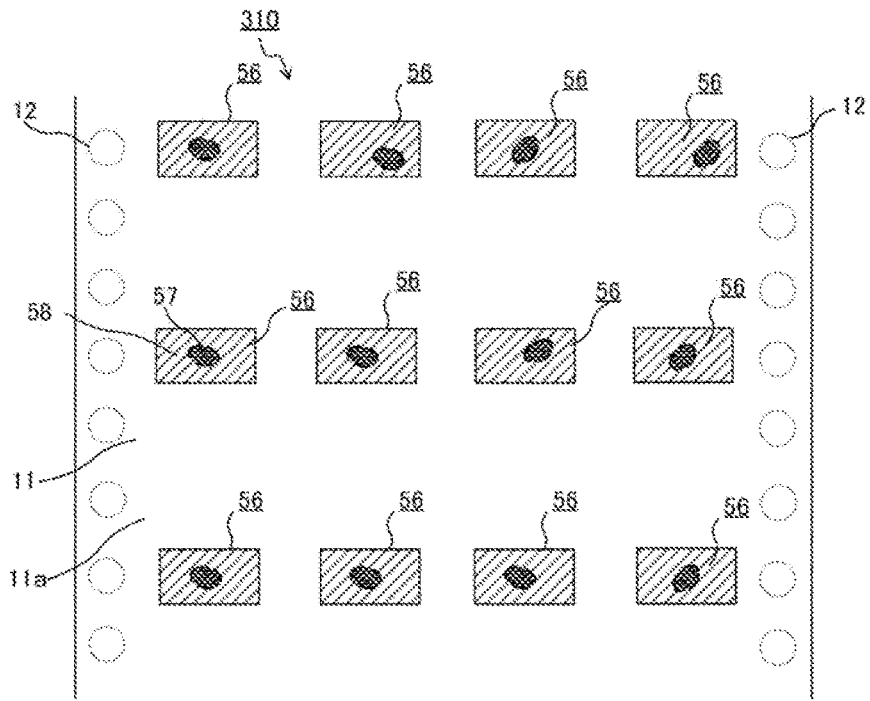

FIG. 8 is a plan view of the seedsheet 310, manufactured by the seedsheet manufacturing apparatus 300 according to Embodiment 3, as viewed from the side of a mounting paper surface 11a. Compared with the seedsheet 10 manufactured by the seedsheet manufacturing apparatus 100 of Embodiment 1, the seedsheet 310 is formed to have a larger pitch of respective pastes in the feeding direction of the mounting paper 11.

Figure 9:
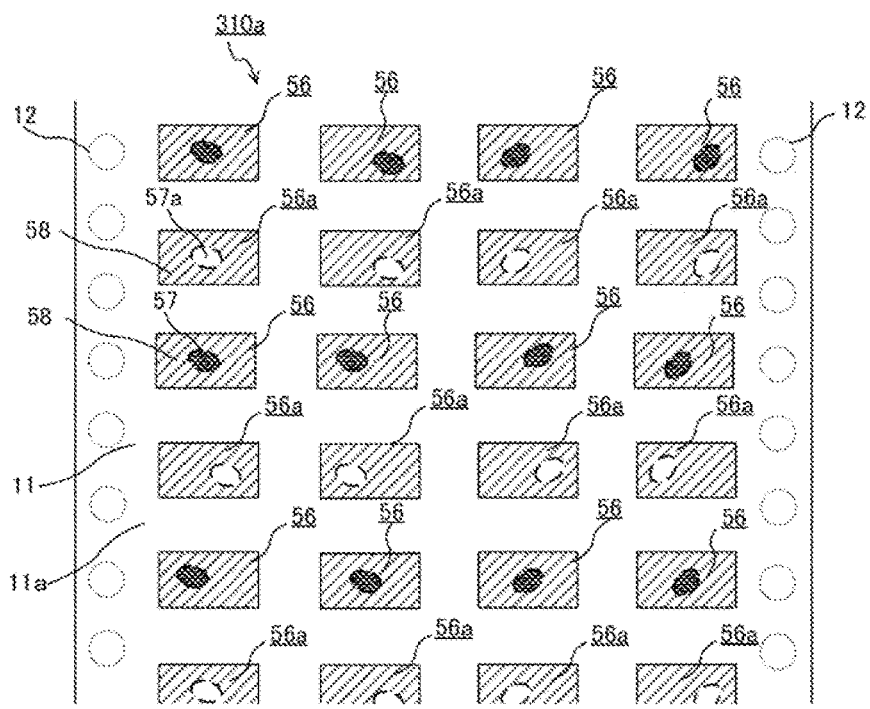
FIG. 9 is a plan view of a seedsheet 310a as viewed from the side of a mounting paper surface 11a, the seedsheet 310a being obtained by causing the seedsheet 310 shown in FIG. 8 to pass through the seedsheet manufacturing apparatus 300 again.

FIG. 9 is a plan view of a seedsheet 310a as viewed from the side of a mounting paper surface 11a, the seedsheet 310a being obtained by causing the seedsheet 310 shown in FIG. 8 to pass through the seedsheet manufacturing apparatus 300 again. The seedsheet 310 on which the printing elements 56 are printed by the seedsheet manufacturing apparatus 300 has a large interval between the printing elements 56 in the feeding direction of the mounting paper 11. When such a seedsheet 310 is caused to pass through the seedsheet manufacturing apparatus 300 again, the seedsheet manufacturing apparatus 300 arranges printing elements 56a between the printing elements 56 that are provided by the first printing. The printing elements 56a contain seeds 57a that are different from the seeds 57 contained in the printing elements 56.

To arrange the printing elements 56a between the printing elements 56 when the printing elements 56a are arranged on the mounting paper 11 by the second printing, the mounting paper 11 has a plurality of positioning holes 12. For example, the positioning holes 12 are equidistantly formed on the mounting paper 11 at both ends in the width direction. In the seedsheet manufacturing apparatus 300, the plate cylinder 320, the pressing roller 30 or feed rollers 31 to 34 includes pins that are inserted into the positioning holes 12 and hence, it is possible to control positions at which the printing elements 56 and 56a are arranged on the mounting paper surface 11a. The control of the arrangement of the printing elements 56a is not limited to the mode where the arrangement of the printing elements 56a is controlled by using the positioning holes 12 and the pins. For example, a feeding speed of the mounting paper 11 may be controlled by using a sensor or the like.

In the seedsheet 310 shown in FIG. 9, two kinds of seeds, that is, seeds 57 and 57a, are arranged adjacent to each other. However, more kinds of seeds may be arranged.

Figure 10:
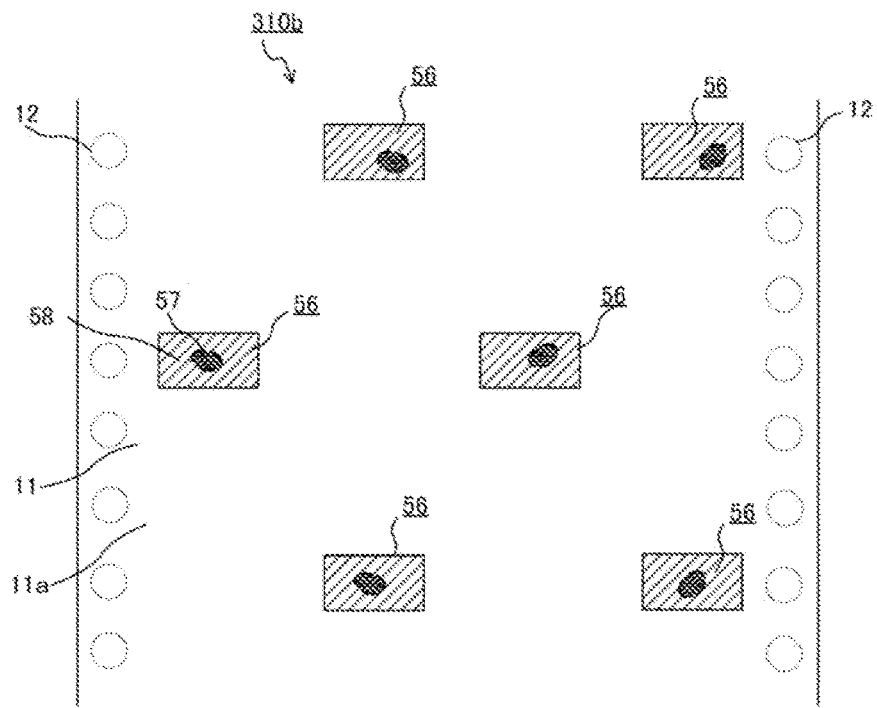
FIG. 10 is a plan view of a seedsheet 310b as viewed from the side of a mounting paper surface 11a, the seedsheet 310b being a modification of the seedsheet 310 manufactured by the seedsheet manufacturing apparatus 300 according to Embodiment 3.

FIG. 10 is a plan view of a seedsheet 310b as viewed from the side of a mounting paper surface 11a, the seedsheet 310b being a modification of the seedsheet 310 manufactured by the seedsheet manufacturing apparatus 300 according to Embodiment 3. Compared with the seedsheet 10 manufactured by the seedsheet manufacturing apparatus 100 of Embodiment 1, the seedsheet 310b is formed to have a large pitch of respective pastes not only in the feeding direction of the mounting paper 11 but also in the width direction. For example, by increasing not only the interval in the rotational direction between the cells 22 formed on the plate cylinder 320 but also the interval in the width direction between the cells 22, the seedsheet manufacturing apparatus 300 can arrange more kinds of seeds.

Figure 11:
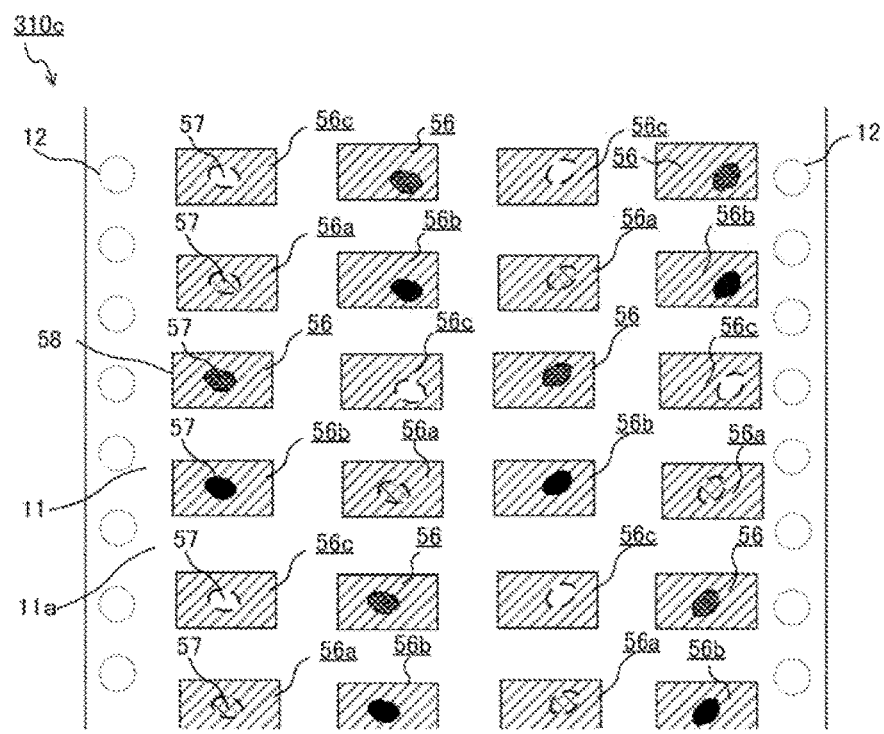
FIG. 11 is a plan view of a seedsheet 310c as viewed from the side of a mounting paper surface 11a, the seedsheet 310c being obtained by causing the seedsheet 310 shown in FIG. 10 to pass through the seedsheet manufacturing apparatus 300 again.

FIG. 11 is a plan view of a seedsheet 310c as viewed from the side of a mounting paper surface 11a, the seedsheet 310c being obtained by causing the seedsheet 310 shown in FIG. 10 to pass through the seedsheet manufacturing apparatus 300 again. In the seedsheet 310c, one of the printing elements 56, 56a, 56b and 56c, respectively containing different seeds 57, 57a, 57b and 57c, is disposed in each unit section. For example, each of the seeds 57, 57a, 57b and 57c is a seed of flower having a different blooming season. When the different kind of seed is disposed in each unit section as described above, it is possible to easily set up a flower bed where different flowers bloom in each season by disposing one seedsheet 310b on the ground, such as a flower bed.

The seedsheet 310c shown in FIG. 11 is manufactured in such a manner that the manufactured seedsheet 310b shown in FIG. 10 is caused to pass through the seedsheet manufacturing apparatus 300 a plurality of number of times. A configuration may be adopted where a plurality of seedsheet manufacturing apparatuses 300 are arranged in series, and the seedsheet 310 is caused to sequentially pass through the plurality of seedsheet manufacturing apparatuses 300 to continuously arrange the printing elements 56, 56a, 56b and 56c. Alternatively, the seedsheet 310c may be manufactured in such a manner that one seedsheet manufacturing apparatus 300 is configured to arrange different pastes on a sheet by changing the setting of the seedsheet manufacturing apparatus 300, and the seedsheet 310 is caused to pass through the same seedsheet manufacturing apparatus 300 a plurality of number of times.

Figure 12:
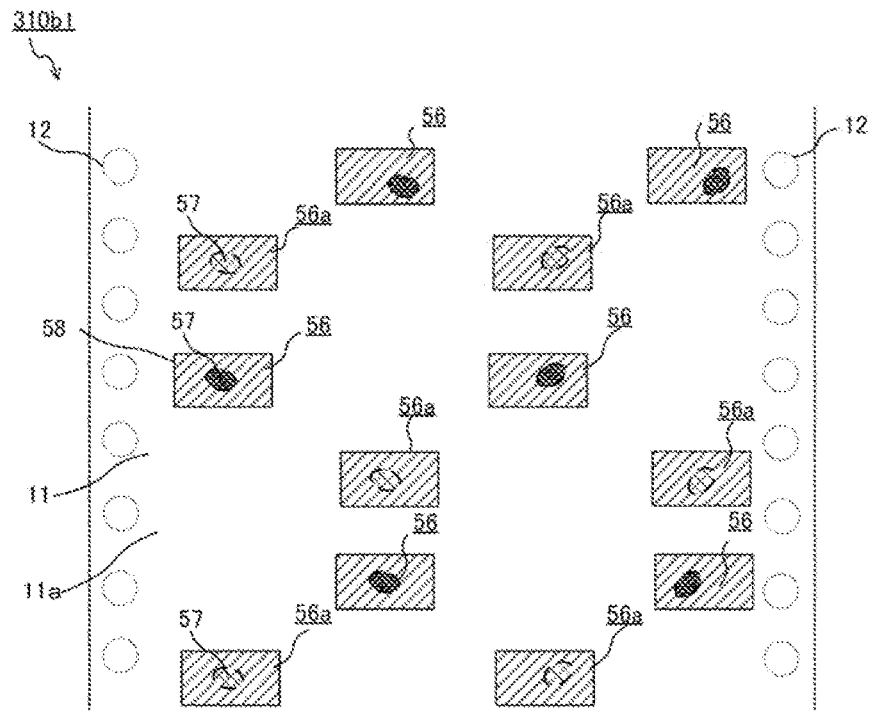
FIG. 12 is a plan view of a seedsheet 310b1 as viewed from the side of a mounting paper surface 11a, the seedsheet 310b1 being obtained by causing the seedsheet 310b to pass through the seedsheet manufacturing apparatus 300 again.

FIG. 12 is a plan view of a seedsheet 310*b*1 as viewed from the side of a mounting paper surface 11*a*, the seedsheet 310*b*1 being obtained by causing the seedsheet 310*b* to pass through the seedsheet manufacturing apparatus 300 again. The seedsheet 310*b*1 is obtained by arranging the printing elements 56*a* at positions displaced from the printing elements 56, arranged on the seedsheet 310*b*, by one unit area in the feeding direction of the mounting paper. In the seedsheet 310*b*1, the arrangement of the printing elements 56*a* can be determined by using the positioning holes 12. The interval between the printing elements 56 is equal to the interval between the printing elements 56*a*. Therefore, by determining the first position at which the mounting paper is fed, the seedsheet manufacturing apparatus 300 can arrange the printing elements 56*a* at positions displaced from the printing elements 56 without changing the plate cylinder 320.

Figure 13:
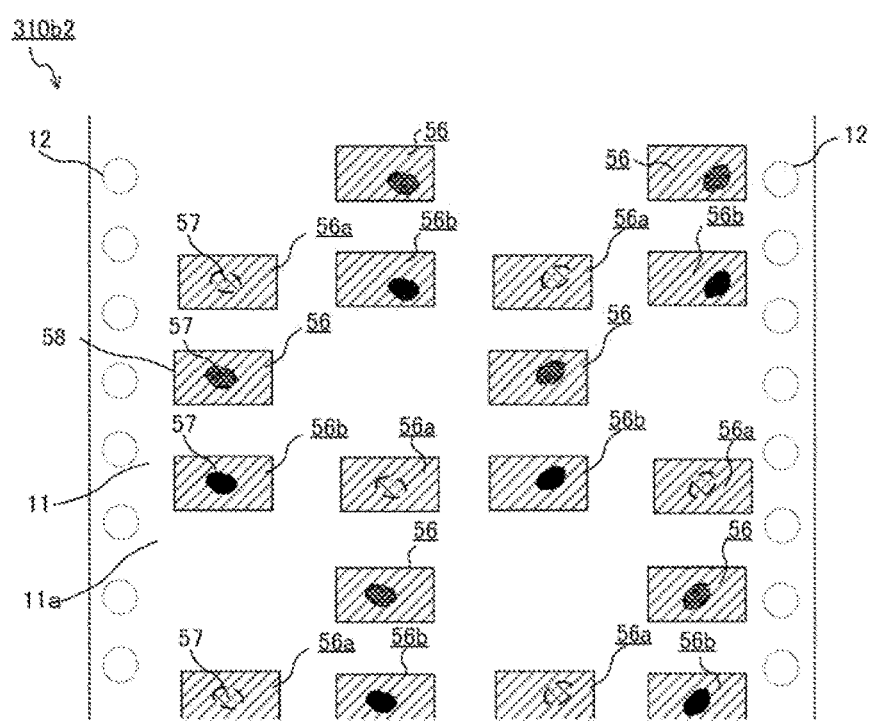
FIG. 13 is a plan view of a seedsheet 310b2 as viewed from the side of a mounting paper surface 11a, the seedsheet 310b2 being obtained by causing the seedsheet 310b1 to pass through the seedsheet manufacturing apparatus 300 again.

FIG. 13 is a plan view of a seedsheet 310*b*2 as viewed from the side of a mounting paper surface 11*a*, the seedsheet 310*b*2 being obtained by causing the seedsheet 310*b*1 to pass through the seedsheet manufacturing apparatus 300 again. In the seedsheet 310*b*2, the printing elements 56*b* are further arranged at positions displaced from the printing elements 56 and 56*a* in the feeding direction of the mounting paper. By determining the first position at which the mounting paper is fed, the seedsheet manufacturing apparatus 300 can arrange the printing elements 56*b* at positions displaced from the printing elements 56 and 56*a* without changing the plate cylinder 320.

As described above, with the seedsheet manufacturing apparatus 300, it is possible to manufacture the seedsheet 310*c* where at least one of a plurality of seeds of different kinds is disposed in each unit section of the surface of the seedsheet 310. A plurality of seeds of the same kind may be disposed in each unit section of the surface of the seedsheet 310. The mounting paper 11 has the plurality of positioning holes 12 arranged in a row along the longitudinal direction of the mounting paper 11, and the arrangement of the printing elements 56, 56*a*, 56*b* and 56*c* can be controlled by the positioning holes 12. The arrangement of the positioning holes 12 may be suitably changed according to the arrangement of the printing elements 56 or other elements. The positioning holes 12 are not necessarily formed in advance in the mounting paper. The positioning holes 12 may be formed by causing the mounting paper 11 to pass through the plate cylinder 320 or the feed rollers 31 to 34.

The arrangement of the printing elements 56, 56*a*, 56*b* and 56*c* described with reference to FIG. 10 to FIG. 13 merely forms one example, and an arrangement pattern and the kind of a paste to be arranged may be changed. Changing the pattern of the cells 22 provided to the plate cylinder 320 allows the seedsheet manufacturing apparatus 300 to achieve a more complicated arrangement of a paste.

For example, in Embodiment 3, a configuration may be adopted where the fluid 58 forming the printing elements 56, 56*a*, 56*b* and 56*c* is colored, and a predetermined design pattern is formed by the arrangement of the printing elements 56, 56*a*, 56*b* and 56*c* on the seedsheet 310. That is to say, in the seedsheet manufacturing apparatus 300, a plurality of kinds of the printing elements 56 can be freely arranged on the mounting paper 11 and hence, a design pattern can be freely formed by adjusting the arrangement of the plurality of kinds of the printing elements 56.

In the case of forming a design pattern on the seedsheet 310, first, the mounting paper 11 is caused to pass through the seedsheet manufacturing apparatus 300 to arrange the printing elements 56 at predetermined positions. At this point of operation, the positions of the printing elements 56 may be freely adjusted corresponding to the cells 22 formed on the plate cylinder 320. Next, the mounting paper where the printing elements 56 are arranged on the surface of the mounting paper is caused to pass through the seedsheet manufacturing apparatus 300 to arrange the printing elements 56*a* that are colored into a color different from the color of the printing elements 56. By repeating this step of causing the mounting paper 11 to pass through the seedsheet manufacturing apparatus 300 suitable number of times, a plurality of printing elements of different colors are arranged on the mounting paper 11, thus forming the predetermined design pattern. The seedsheet 310 may be manufactured by the plurality of seedsheet manufacturing apparatuses 300, or may be manufactured by causing the mounting paper 11 to pass through the same seedsheet manufacturing apparatus 300 a plurality of number of times.

Embodiment 4

A seedsheet 410*a* according to Embodiment 4 will be described. The seedsheet 410*a* is manufactured by the seedsheet manufacturing apparatus 100. A point that makes the seedsheet 410*a* different from the seedsheet 10 according to Embodiment 1 is that the printing element 56 has a multi-layer structure. In Embodiment 4, points that make Embodiment 4 different from Embodiments 1 to 3 will be mainly described. Constitutional elements having the same function and manner of operation as the constitutional elements in Embodiments 1 to 3 are given the same reference symbols, and the repeated description of such constitutional elements will be omitted.

Figure 14:
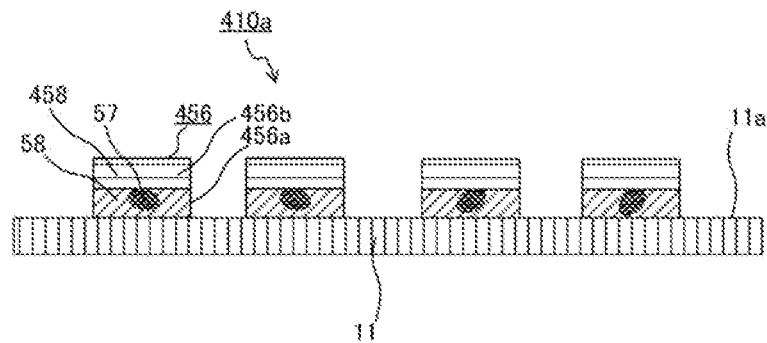
FIG. 14 is an explanatory view of the cross sectional structure of a seedsheet 410a according to Embodiment 4.

FIG. 14 is an explanatory view of the cross sectional structure of the seedsheet 410*a* according to Embodiment 4. Each of the printing elements 56 arranged on the surface of the seedsheet 410*a* has a multi-layer structure. A first layer 456*a*, being the lowermost layer of the printing element 56, is formed to have a structure equal to the structure of the printing elements 56, 56*a*, 56*b* and 56*c* shown in Embodiments 1 and 3, and a second layer 456*b* is placed on the first layer 456*a*. A fluid 458 forming the second layer 456*b* may be, for example, a paste into which a chemical, such as a herbicide, is mixed, a paste containing a fertilizer, or a paste colored for decoration. The seedsheet 410*a* may include a larger number of layers. The order of lamination of the respective layers is not limited to the mode shown in FIG. 14, and may be suitably changed.

The seedsheet 410*a* can be manufactured by the seedsheet manufacturing apparatus 100 or 300 in the same manner as Embodiment 1 or 3. The printing elements 56 are caused to have a multi-layer structure by causing the seedsheet 410*a* to pass through the seedsheet manufacturing apparatus 100 or 300 a plurality of number of times while the plate cylinder 20 or 320 is suitably replaced. Alternatively, a configuration may be adopted where a plurality of seedsheet manufacturing apparatuses 100 and a plurality of seedsheet manufacturing apparatuses 300 are connected in series to continuously print the first layer 456*a* and the second layer 456*b*.

Figure 15:
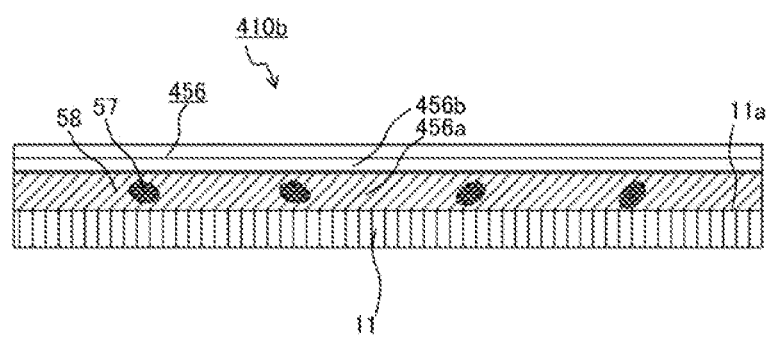
FIG. 15 is an explanatory view of the cross sectional structure of a seedsheet 410b being a modification of the seedsheet 410a according to Embodiment 4.

FIG. 15 is an explanatory view of the cross sectional structure of a seedsheet 410*b* being a modification of the seedsheet 410*a* according to Embodiment 4. The printing element 56 of the seedsheet 410*b* is formed to have a multi-layer structure in the same manner as the seedsheet 410*a*. However, the printing element 56 is not arranged in a state where respective printing elements are separately arranged, but is arranged in a state where a single printing element 456 is arranged on the mounting paper surface 11*a*, and the printing element 456 has a multi-layer structure. That is to say, the printing element 456 is obtained by causing the printing element 256 of the seedsheet 210 according to Embodiment 2 to have a multi-layer structure.

Figure 16:
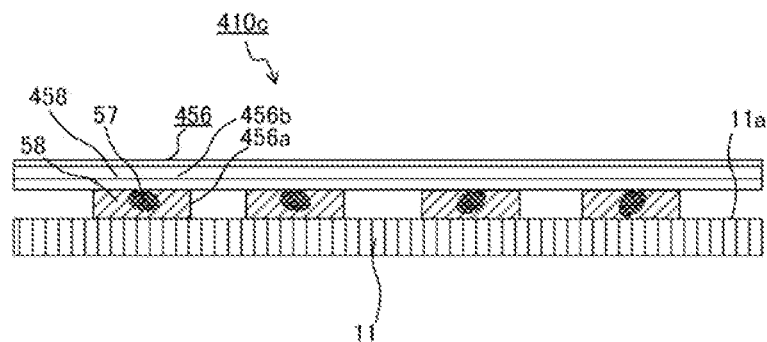
FIG. 16 is an explanatory view of the cross sectional structure of a seedsheet 410c being a modification of the seedsheet 410a according to Embodiment 4.

FIG. 16 is an explanatory view of the cross sectional structure of a seedsheet 410c being a modification of the seedsheet 410a according to Embodiment 4. In the seedsheet 410c, the first layers 456a are separately arranged, but the second layer 456b is formed as a single paste. The second layer 456b is a printing element disposed to cover the first layers 456a, being the plurality of separated printing elements. In FIG. 16, the surface of the second layer 456b is linearly shown. However, the surface of the second layer 456b may have unevenness corresponding to an uneven shape formed by the first layers 456a. Further, in FIG. 16, a space is shown between each two first layers 456a. However, in an actual configuration, such spaces may be filled with the fluid 458 forming the second layer 456b.

The order of the arrangement of the first layers 456a and the second layer 456b shown in FIG. 16 may be reversed in the vertical direction. Further, each of the arrangement pattern of the first layers 456a and the arrangement pattern of the second layer 456b may be suitably changed. That is to say, the seedsheet 410c may include the first layers 456a being a plurality of printing elements arranged on the mounting paper surface 11a, and include the second layer 456b being one printing element that covers the first layers 456a. Alternatively, a plurality of second layers 456b may be disposed on one first layer 456a. The seedsheet 410c may include a plurality of first layers 456a and a plurality of second layers 456b.

The surface of the second layer 456b shown in FIG. 14 is configured to form a specific design pattern when the mounting paper 11 is viewed in a plan view. That is to say, the colored second layers 456b aggregate to form a design pattern, such as a predetermined pattern. Therefore, the seedsheet 410a has an advantageous effect that the seedsheet 410a has a good appearance even before the seeds 57 sprout and an aesthetic appearance of the surrounding is improved when the seedsheet 410a is disposed. The surface of the second layer 456b shown in FIG. 14 and FIG. 16 may have a predetermined design pattern.

The configurations shown in the above-mentioned Embodiments merely show one example. The respective Embodiments and the respective modifications may be combined together, or may be combined with another known technique. Further, the configuration may be partially omitted or modified without departing from the gist.

REFERENCE SIGNS LIST

10: seedsheet, 11: mounting paper, 11a: mounting paper surface, 20: plate cylinder, 21: protruding portion, 22: cell, 23: doctor blade, 24: surface, 30: pressing roller, 30a: surface, 31: feed roller, 32: feed roller, 33: feed roller, 34: feed roller, 35: fixing machine, 36: recovery unit, 40: gap, 50: paste, 51: paste reservoir, 53: paste, 54: paste, 56: printing element, 56a to 56c: printing element, 57: seed, 58: fluid, 100: seedsheet manufacturing apparatus, 200: seedsheet manufacturing apparatus, 210: seedsheet, 220: plate cylinder, 224: surface, 253: paste, 254: paste, 256: printing element, 300: seedsheet manufacturing apparatus, 310: seedsheet, 310a: seedsheet, 310b: seedsheet, 310b1: seedsheet, 310b2: seedsheet, 310c: seedsheet, 320: plate cylinder, 410a: seedsheet, 410b: seedsheet, 410c: seedsheet, 456: printing element, 456a: first layer, 456b: second layer, 458: fluid.

The invention claimed is:

1. A seedsheet manufacturing apparatus comprising:
a paste reservoir configured to store a paste in which a seed and a fluid are mixed;
a plate cylinder disposed above the paste reservoir;
a doctor blade configured to scrape a portion of the paste adhering to a surface of the plate cylinder;
a pressing roller disposed such that the pressing roller faces the plate cylinder and a mounting paper is allowed to pass through a gap formed between the pressing roller and the surface of the plate cylinder;
a supply unit configured to feed the mounting paper to the gap; and
a recovery unit configured to recover the mounting paper that passes through the gap.

2. The seedsheet manufacturing apparatus of claim 1, wherein
a cell being a recess is formed on the surface of the plate cylinder.

3. The seedsheet manufacturing apparatus of claim 1, further comprising a fixing machine configured to cure the paste adhering to a surface of the mounting paper.

* * * * *